Patented Apr. 25, 1944

2,347,464

UNITED STATES PATENT OFFICE 2,347,464

METHOD OF PULVERIZING RESINOUS AND THERMOPLASTIC MATERIALS

Charles W. Cuno, Wilmington, Ill., assignor to The Lehon Company, Chicago, Ill., a corporation of Illinois No Drawing. Application December 8, 1939, Serial No. 308,217

6 Claims. (Cl. 260—758)

The invention relates to the comminution or pulverization of thermo-plastic materials, resinous substances, elastic substances and the like, such as natural and synthetic resins, asphalts, tars, rubbers and including also their colloidal suspensions, and it consists in certain processes and apparatus for grinding said materials and substances to prevent deterioration, chemical reaction or explosion which might otherwise occur.

It is well known in the art that thermo-plastic substances and others which are solids at ordinary temperatures but which become liquid at higher temperatures can be successfully pulverized to a fine powder by grinding the materials in intimate contact with a liquid hydrocarbon such as propane or solid carbon dioxide known as "dry ice." Asphalt has been pulverized to relatively fine particles in this manner and it is also known commercially that chemically sensitive dyes can be ground in contact with "dry ice" to the desired degree of fineness, whereas, if ground under ordinary conditions they would tend to decompose.

The present invention is an improvement on the above and has for an object the pulverization of thermo-plastic, resinous and elastic substances by the use of carbon dioxide to which has been added other liquified gases such as nitrogen, air, oxygen, methylchloride, chlorine, sulphur dioxide and the like.

More specifically the invention proposes to use solid carbon dioxide and five per cent to twenty per cent of other liquified gases as above mentioned in the pulverization of materials which can not be pulverized readily by the use of carbon dioxide alone. In addition the process of the invention finds application in the grinding of two or more materials to produce a mixture of finely divided particles, where on account of chemical activity or by reason of mechanical difficulties the grinding can not be successfully performed without the presence of said gases.

The gases employed in the process of the invention accomplish a dual function. By reason of their excessive low temperature when in liquified or solidified form they cool the materials, preventing agglomeration, and which also facilitates the grinding process by rendering the material friable. Secondly, while the grinding proceeds the gases which are given off absorb the heat of the grinding process and also blanket the materials with a non-reactive substance, preventing contact with the atmosphere which might otherwise combine chemically with the materials or cause reaction between the materials themselves. On the other hand, it very often happens that certain reactions are desired and in this event the invention can be carried out with those gases which either directly produce the desired chemical action or aid in the production of the same.

In the pulverization of milled rubber it has been found that cooling the rubber by the use of solidified carbon dioxide only, does not lower the temperature sufficiently for a satisfactory grinding operation. Milled rubber has a relatively low melting point and due to its high content of solvents is workable and elastic. A much lower temperature is needed to render the same friable to the extent where the rubber can be pulverized to a fine degree of fineness and accordingly, the invention contemplates adding to the "dry ice" at the start of the grinding process another gas in liquified form which, in combination, will produce the desired low temperature. Whereas, with "dry ice" alone a grinding temperature of approximately minus 40 degrees Fahr. is the lowest that can be obtained, the grinding temperature can be caused to drop below 100 degrees Fahr. by adding liquid nitrogen, liquid air or liquid oxygen. As regards these latter gases oxidation of the milled rubber during the grinding process must be considered. However, it is found that with the low temperature at which the grinding takes place, chemical action of these gases on the milled rubber is practically inhibited. In adding the liquid nitrogen, air or oxygen and the like to "dry ice" it is found that the latter absorbs the liquified gases and by so doing the "dry ice," otherwise a relatively solid mass, becomes soft and of rather loose consistency. However, if the liquified gases are added in amounts which do not exceed twenty per cent by volume of the "dry ice", the "dry ice" maintains a solidified form so that a satisfactory grinding process can be carried out.

In addition to the pulverization of milled rubber as above described, other thermo-plastics having a low melting point can also be ground in like manner. This includes both natural and synthetic resins and gums. Also the pulverization of reclaimed rubber or vulcanized rubber to a fine powder requires a lower temperature than can be secured by the use of "dry ice" alone. When other liquified gases as above mentioned are added to the "dry ice" the low temperature secured materially improves the grinding.

Another application of the present invention resides in the pulverization of two thermo-plastic substances, one or both of which decompose at elevated temperatures. Thus asphalt having a melting point of about 260 degrees Fahr. can not be mixed with rubber by heating the mixture since the rubber will partially decompose at a temperature below the melting point of the asphalt. Also it is very probable that reactions with the asphaltic acids would take place, with the result that a non-homogeneous mass more or less worthless is produced. When ground in accordance with the invention it is possible to secure a homogeneous powder which upon subsequent treatment will give a product having valuable plastic and adhesive properties. The liquefied gas added to the "dry ice" in order to maintain a sufficiently low temperature during the grinding process as above described must be selected to prevent undesired chemical action. Liquified nitrogen, air and oxygen have performed satisfactorily since these are relatively inert as regards the asphalt and the rubber, particularly at the low temperature maintained during the grinding process.

Another example of the grinding of thermoplastic substances together in accordance with the above method resides in the grinding of rubber latex and/or other emulsions such as a wax emulsion, a resin or an asphalt emulsion, with diatomaceous earth or similar filler. In this case a dry, finely divided mixture of the emulsion and filler is desired, and accordingly it is necessary to volatilize the water. The rubber latex or other emulsion is cooled prior to grinding by the addition thereto of "dry ice" to which is then added five to twenty per cent of a liquified gas such as nitrogen and the like to further lower the temperature. The filler is added in amounts which may vary from five to ten per cent, it being understood that the filler functions merely to maintain the particles apart and is not necessarily essential as regards the present process. The mixture is then ground under a gradually increasing vacuum and toward the end of the grinding process the temperature is allowed to rise, whereby the water which is present by reason of the emulsion is volatilized.

As previously explained, it is also possible to apply the method of the invention to the pulverization of thermo-plastic substances and where at the same time it is desired to either inhibit chemical reactions or to produce selective chemical reactions. Thus, for example, asphalt which is blown hot with air or oxygen yields a well-known product which is used in the manufacture of shingles. However, the action of the oxygen on the asphalt produces products outside of the blown residue which are mainly carbon dioxide, steam and a cracked distillate useful only as fuel oil. The losses are known to run from five to twenty per cent. If the same asphalt is pulverized to a fine powder by using "dry ice" and another gas in liquified form to secure the necessary low temperature for the grinding process, chemical action is inhibited entirely as to the formation of the cracked distillate, carbon dioxide, steam and water. The reaction may be said to be retarded toward the asphaltenes and is selective toward the acids and unsaturated compounds present. Accordingly, the losses are less because the chemical action of the oxygen is additive instead of destructive.

Liquid nitrogen, air or oxygen may be added to the "dry ice" for carrying out the above example and other gases may be used such as liquefied chlorine, sulphur dioxide and methyl chloride where desired chemical action is wanted. For example, when chlorine is used it acts as a catalytic agent and a somewhat different produce results having different characteristics such as melting point and the like.

Nitrogen, air, oxygen, methyl chloride, chlorine and sulphur dioxide which have been mentioned as the preferred gases that can be liquified and added to the solidified carbon dioxide all have a temperature when in liquid form which is below that of the solid carbon dioxide. This is necessary, of course, since the sole object of adding these liquified gases to the solid carbon dioxide is to lower the temperature of the materials being pulverized below the temperature which the materials would assume if only solid carbon dioxide were used. Therefore the gases to be liquified and added to the solid carbon dioxide must be selected so as to secure the desired chemical reaction or so as to inhibit any chemical action, as the case may be, but in addition the gases must also be selected from the group which when in liquified form have a temperature below that of the solid carbon dioxide.

It is to be understood that many other uses and applications of the invention will be apparent to those skilled in the art and it is not desired that this invention be limited to the details described for its scope includes such forms of improvements as come within the spirit of the following claims construed as broadly as the prior art will permit.

What is claimed is:

1. A method of grinding a thermo-plastic material to produce a finely pulverized product, which consists in mixing the material with solid carbon dioxide to substantially lower the temperature of the material, treating the solid carbon dioxide by adding a liquified gas thereto having a temperature below that of the solid carbon dioxide to further lower the temperature of the material, said solid carbon dioxide having the property of absorbing the liquified gas, the amount of liquified gas added to the solid carbon dioxide not exceeding the amount required to render the solid carbon dioxide soft and cause the same to lose its solid characteristic before volatilization thereof, and finally grinding the material while in intimate contact with the solid carbon dioxide as thus treated.

2. A method of grinding material that can not be satisfactorily ground at normal temperatures which consists in treating solid carbon dioxide by adding thereto a liquified gas having a temperature lower than that of the solid carbon dioxide, the solid carbon dioxide having the property of absorbing the liquified gas, maintaining the carbon dioxide in solid form up to the time of volatilization thereof by adding the liquified gas in an amount not exceeding the amount required to render the solid carbon dioxide soft and cause the same to lose its solid characteristic, mixing said treated carbon dioxide with the material to be ground, and finally subjecting the mixture to a grinding operation.

3. The method of preparing thermo-plastics for grinding to produce a pulverized mixture of the same, which consists in freezing the said thermo-plastics to facilitate grinding thereof by maintaining the said materials in intimate contact with solid carbon dioxide to which has been added a liquified gas having a temperature below that of the solid carbon dioxide, the solid carbon dioxide having the property of absorbing the liquified gas, and said liquified gas having been added in amounts ranging from five to approximately twenty per cent by volume of the solid carbon dioxide, whereby the carbon dioxide maintains its solid form and does not become soft prior to volatilization thereof.

4. The method of grinding asphalt and rubber together to produce a finely pulverized mixture of the two materials, which consists in adding solid carbon dioxide to a mixture of said materials prior to the grinding operation, treating said solid carbon dioxide by adding thereto a liquified gas having a temperature below that of the solid carbon dioxide and in amounts ranging approximately from five to twenty per cent by volume of the solid carbon dioxide, the carbon dioxide having the property of absorbing the liquified gas in said amounts and of also maintaining its solid characteristic up to the time of volatilization thereof, and in finally subjecting the materials to a grinding operation in the presence of the solid carbon dioxide as thus treated.

5. The method of pulverizing a thermo-plastic material in the form of an emulsion comprising said material and water, which consists in grinding said material in the presence of solid carbon dioxide to maintain the material at a low temperature during the grinding operation, treating said solid carbon dioxide by adding liquified gas to the same having a temperature below that of the carbon dioxide to further lower the temperature of the material maintaining the mixture of solid carbon dioxide and material during said grinding operation under a pressure below atmospheric, and then raising the temperature of the material to approximately normal at the end of the grinding operation, whereby any water in the pulverized mass is volatilized.

6. The method of pulverizing a thermo-plastic material in the form of an emulsion comprising said material and water, which consists in grinding said material in the presence of solid carbon dioxide to which has been added a liquified gas having a temperature below that of the solid carbon dioxide and in amounts ranging approximately from five to twenty per cent by volume of the solid carbon dioxide, the solid carbon dioxide having the property of absorbing the liquified gas in said amounts and of also maintaining its solid characteristic up to the time of volatilization thereof, adding to the mixture a filler in proper proportions, maintaining the mixture during the grinding operation under a pressure below atmospheric, and then raising the temperature of the material to approximately normal at the end of the grinding operation, whereby any water in the pulverized mass is volatilized.

CHARLES W. CUNO.